(12) United States Patent
Taniguchi (10) Patent No.: US 10,259,346 B2
(45) Date of Patent: Apr. 16, 2019

(54) SEAT SLIDING DEVICE

(71) Applicant: TOYOTA BOSHOKU KABUSHIKI KAISHA, Aichi-ken (JP)

(72) Inventor: Kosuke Taniguchi, Aichi (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 15/655,198

(22) Filed: Jul. 20, 2017

(65) Prior Publication Data

US 2018/0022236 A1    Jan. 25, 2018

(30) Foreign Application Priority Data

Jul. 22, 2016   (JP) .................................. 2016-144502

(51) Int. Cl.
*B60N 2/07*  (2006.01)
*B60N 2/08*  (2006.01)

(52) U.S. Cl.
CPC .......... *B60N 2/0705* (2013.01); *B60N 2/0722* (2013.01); *B60N 2/0818* (2013.01); *B60N 2/0875* (2013.01); *B60N 2/07* (2013.01)

(58) Field of Classification Search
USPC ........... 248/424, 429, 430; 296/65.11, 65.01, 296/65.13, 65.14; 297/311, 312, 314, 318
See application file for complete search history.

(56) References Cited

U.S. PATENT DOCUMENTS

| | | | | |
|---|---|---|---|---|
| 5,188,329 | A * | 2/1993 | Takahara | B60N 2/0705 248/345.1 |
| 5,242,143 | A * | 9/1993 | Nagashima | B60N 2/0705 248/188.9 |
| 6,820,851 | B2 * | 11/2004 | Mochizuki | B60N 2/067 248/429 |
| 2010/0006733 | A1 * | 1/2010 | Kimura | B60N 2/0705 248/430 |
| 2010/0090084 | A1 * | 4/2010 | Moriyama | B60N 2/0725 248/430 |
| 2015/0090854 | A1 * | 4/2015 | Hayashi | B60N 2/0705 248/429 |

FOREIGN PATENT DOCUMENTS

| | | |
|---|---|---|
| DE | 102014219233 A1 | 4/2015 |
| EP | 2174827 A2 | 4/2010 |
| JP | 2014-231298 | 12/2014 |

OTHER PUBLICATIONS

German Office Action dated Apr. 19, 2018 in the corresponding German patent application No. 102017212372.9 (and an English translation thereof).

* cited by examiner

*Primary Examiner* — Alfred J Wujciak
(74) *Attorney, Agent, or Firm* — Greenblum & Bernstein, P.L.C.

(57) ABSTRACT

Provided is a seat sliding device. The seat sliding device comprises a fixed-side rail, a movable-side rail, a plurality of first sliding bodies, and a plurality of second sliding bodies. The plurality of second sliding bodies are provided at least at an end on a first side of a sliding direction in at least one of the fixed-side rail and the movable-side rail, and are configured to be interposed between the fixed-side rail and the movable-side rail, so as to be able to make the movable-side rail slide in the sliding direction with respect to the fixed-side rail.

15 Claims, 10 Drawing Sheets

SEAT SLIDING DEVICE

CROSS-REFERENCE TO RELATED APPLICATIONS

This application claims the benefit of Japanese Patent Application No. 2016-144502 filed on Jul. 22, 2016 with the Japan Patent Office, the entire disclosure of which is incorporated herein by reference.

BACKGROUND

The present disclosure relates to a seat sliding device.

Conventionally, a seat sliding device is known that slidably supports a conveyance seat such as a vehicle seat. For example, a seat sliding device disclosed in Japanese Unexamined Patent Application Publication No. 2014-231298 comprises a fixed-side rail, a movable-side rail, and sliding bodies. The movable-side rail is configured to support a seat and to be assembled to the fixed-side rail so as to be slidable with respect to the fixed-side rail. The sliding bodies are members interposed between the fixed-side rail and the movable-side rail, and make the movable-side rail slide in a sliding direction with respect to the fixed-side rail.

To an end portion of the movable-side rail, a cover member is attached to cover the end portion of the movable-side rail, so as to inhibit limbs or the like of a person seated on a conveyance seat from contacting the end portion of the movable-side rail, to reduce the risk of the limbs or the like reaching an internal space of the fixed-side rail, and to improve its appearance.

SUMMARY

In the above-described seat sliding device, from the viewpoint of layout inside the vehicle and mountability, it is requested to shorten lengths of the fixed-side rail and the movable-side rail while maintaining a slide distance of the movable-side rail. On the other hand, due to demands to improve getting on and off performance of a vehicle occupant as well as to increase luggage capacity, it is requested to increase the slide distance of the movable-side rail. Further, in order to reduce weight, it is desired to thin the fixed-side rail and the movable-side rail.

However, if the lengths of the fixed-side rail and the movable-side rail are shortened or the fixed-side rail and the movable-side rail are thinned, while the slide distance of the movable-side rail is maintained or increased, there is the risk that the sliding bodies interposed therebetween are unable to sufficiently hold the fixed-side rail and the movable-side rail, when a load externally applied (hereinafter, an external load), for example at the time of collision or the like of the vehicle, acts on the vehicle. In other words, rigidity against external loads decreases, which may increase deflection of the movable-side rail and the fixed-side rail.

The present disclosure provides a seat sliding device that can improve rigidity against external loads.

A seat sliding device in one aspect of the present disclosure slidably supports a conveyance seat. The seat sliding device comprises: a fixed-side rail; a movable-side rail that is configured to support the conveyance seat and to be assembled to the fixed-side rail, so as to be slidable with respect to the fixed-side rail; first sliding bodies that are interposed between the fixed-side rail and the movable-side rail, so as to make the movable-side rail slide in a sliding direction with respect to the fixed-side rail; and second sliding bodies that are provided at least at an end on a first side of the sliding direction in at least one of the fixed-side rail and the movable-side rail, and are configured to be interposed between the fixed-side rail and the movable-side rail, so as to be able to make the movable-side rail slide in the sliding direction with respect to the fixed-side rail.

Therefore, for example, when an external load is applied at the time of collision or the like of the vehicle, the fixed-side rail and the movable-side rail can be held not only by the first sliding bodies but also by the second sliding bodies.

Thus, rigidity against external loads can be improved. Accordingly, even if the lengths of the fixed-side rail and the movable-side rail are shortened or the fixed-side rail and the movable-side rail are thinned, for example while the slide distance of the movable-side rail is maintained or increased, rigidity against external loads can be sufficiently secured. Decrease in rigidity against external loads as well as increase of deflection of the movable-side rail and the fixed-side rail as in the past can be inhibited.

In the above-described seat sliding device, the plurality of second sliding bodies may be held by a retaining member fixed to the end on the first side.

In the above-described seat sliding device, a cover member is provided at least at the end on the first side of at least one of the fixed-side rail and the movable-side rail. The cover member comprises a main body and an extending portion. The extending portion comprises the second sliding bodies. The retaining member may include the cover member.

The end is covered by the main body of the covering member. Therefore, contact with the end by the limbs or the like of a person seated on the conveyance seat can be inhibited, the risk of the limbs or the like reaching an internal space of the rail from the end can be reduced, improvement in appearance can be achieved.

In the above-described seat sliding device, the other of the fixed-side rail and the movable-side rail may be configured to be relatively slidable with respect to the one of the rails, between a position on an inner side and a position on an outer side of the covering member in the one of the rails, in the sliding direction. In this case, even if the other of the fixed-side rail and the movable-side rail is configured to be able to project from an end of the one of the rails, an effect to improve rigidity against external loads can be sufficiently achieved by the covering member provided to the end of the one of the rails.

Further, the covering member may be provided both to an end on a first side of the sliding direction in the fixed-side rail, and to an end on a second side of the sliding direction in the movable-side rail. In this case, rigidity against external loads can be all the more improved by the covering member provided to both the fixed-side rail and the movable-side rail.

Further, the first sliding bodies may be configured to be positioned between the second sliding bodies of the covering member of the fixed-side rail and the second sliding bodies of the covering member of the movable-side rail. In this case, when an external load is applied, the fixed-side rail and the movable-side rail can be effectively held by the first sliding bodies and the second sliding bodies.

Further, the second sliding bodies may be configured to be interposed at the same positions as positions where the first sliding bodies are interposed between the fixed-side rail and the movable-side rail, when viewed from the sliding direction. In this case, when an external load is applied, a configuration to hold the fixed-side rail and the movable-side rail by the first sliding bodies and the second sliding bodies can be simplified.

Further, the movable-side rail comprises two side walls, a lid wall that couples respective one ends of the two side walls, and two folded-back walls that extend in a manner to be folded back outward from the other ends of the two side walls toward the lid wall. The second sliding bodies may be arranged at least one of between the fixed-side rail and respective leading-end portions of the two folded-back walls of the movable-side rail, and between the fixed-side rail and respective based end portions of the two folded-back walls of the movable-side rail. In this case, when an external load is applied, the fixed-side rail and the movable-side rail can be sufficiently held by the second sliding bodies. Thus, the effect to improve rigidity against external loads can be sufficiently achieved.

Further, the second sliding bodies may be arranged both between the fixed-side rail and the respective leading-end portions of the two folded-back walls of the movable-side rail, and between the fixed-side rail and the respective base end portions of the two folded-back walls of the movable-side rail. In this case, rigidity against external loads can be all the more improved.

BRIEF DESCRIPTION OF THE DRAWINGS

An example embodiment of the present disclosure will be described below with reference to the accompanying drawings, in which.

DETAILED DESCRIPTION OF THE PREFERRED EMBODIMENTS

A seat sliding device according to the present embodiment slidably supports a vehicle seat of a car or the like.

In the present embodiment, arrows and the like on the drawings indicating up and down, front and rear, and right and left directions are intended to facilitate understanding of relationships between the drawings. The scope of the present disclosure is not limited by the directions on the drawings.

As shown in FIGS. 1 to 10, a seat sliding device 1 is provided to a lower end of a conveyance seat (hereinafter, referred to as a seat) S. The seat sliding device 1 comprises a fixed-side rail 2, a movable-side rail 3, first sliding bodies 41A to 41D, 42A to 42D, retaining members 5A to 5D, a lock spring 6, a releasing member 7, and covering members 8 and 9.

Figure 1:
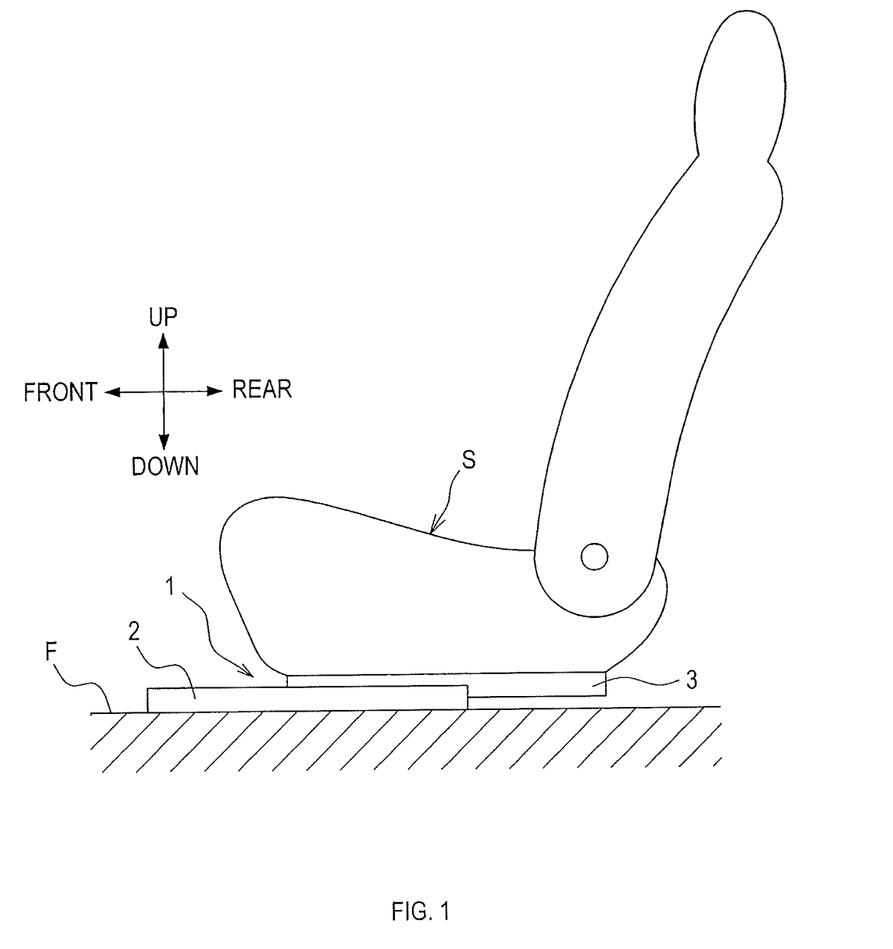
FIG. 1 is a view showing an assembled state of a seat sliding device.

As shown in FIG. 1, the fixed-side rail 2 is fixed on a floor F of a vehicle such that a longitudinal direction of the fixed-side rail 2 coincides with a front-rear direction (i.e., a front-rear direction of the seat S) of the vehicle. The movable-side rail 3 is assembled to the fixed-side rail 2. The movable-side rail 3 is configured to be slidable with respect to the fixed-side rail 2 in the front-rear direction of the vehicle.

The seat S is assembled to an upper part of the movable-side rail 3. The seat S is supported by the movable-side rail 3. The seat S is configured to be slidable, integrally with the movable-side rail 3, with respect to the fixed-side rail 2 in the front-rear direction.

The seat sliding device 1 is provided to each width-direction side of the seat S. That is, the seat S is assembled to the vehicle via the two seat sliding devices 1. The width direction of the seat S coincides with a width direction, i.e., a left-right direction, of the vehicle.

Hereinafter, a first seat sliding device 1, of the two seat sliding devices 1 provided to respective left and right sides of the seat S, will be explained in detail, and an explanation of a second seat sliding device 1 basically having the same structure as the first seat sliding device 1 will not be made.

Figure 2:
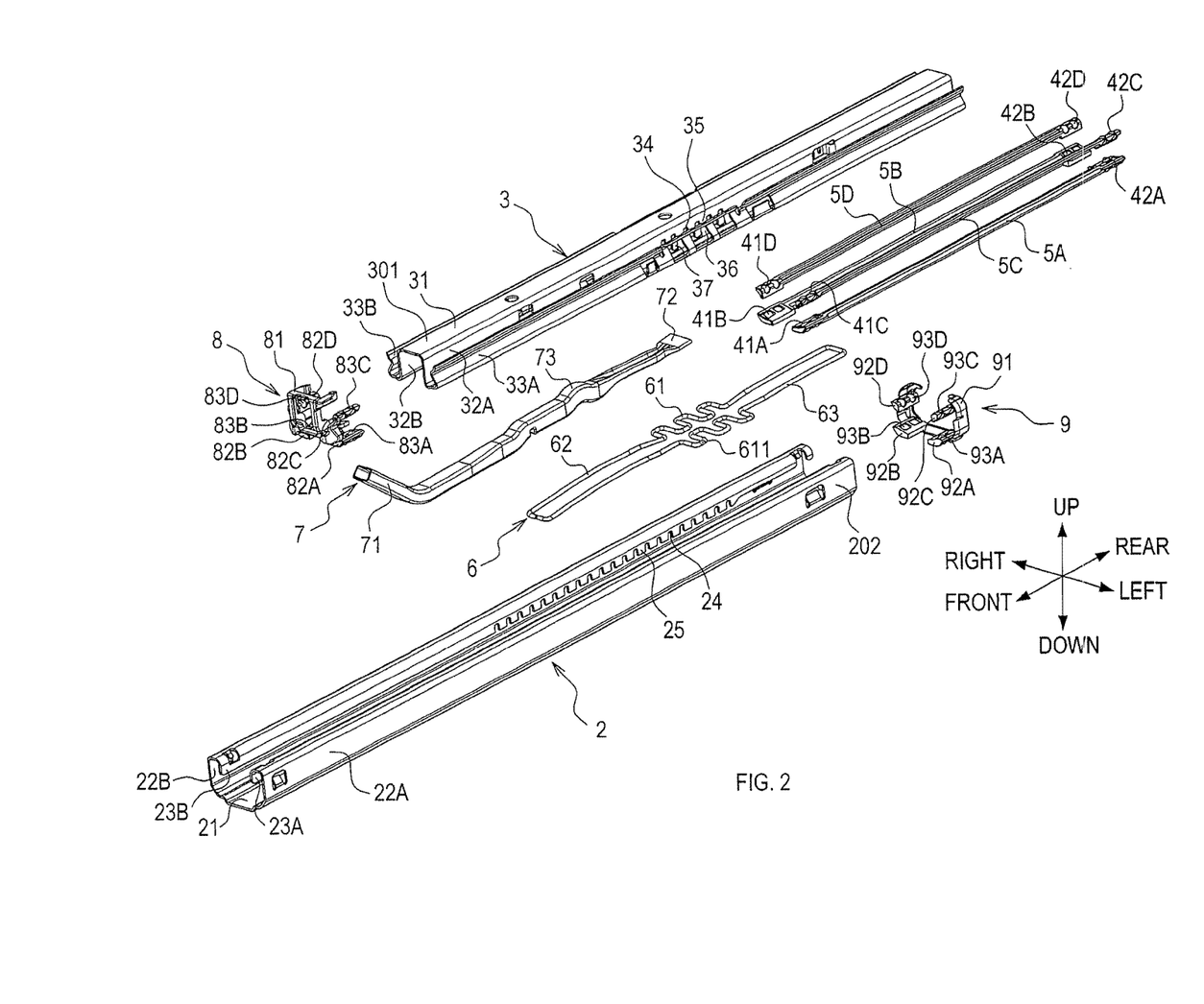
FIG. 2 is an exploded perspective view of the seat sliding device.

As shown in FIG. 2, the fixed-side rail 2 is a metal member formed by pressing a rolled steel plate or the like. The fixed-side rail 2 comprises a lower wall 21 which is a lid wall, a left side wall 22A, a right side wall 22B, a left folded-back wall 23A, and a right folded-back wall 23B. The lower wall 21, the left side wall 22A, the right side wall 22B, the left folded-back wall 23A and the right folded-hack wall 23B extend in a strip-like manner in the longitudinal direction (the front-rear direction) of the fixed-side rail 2.

Figure 5:
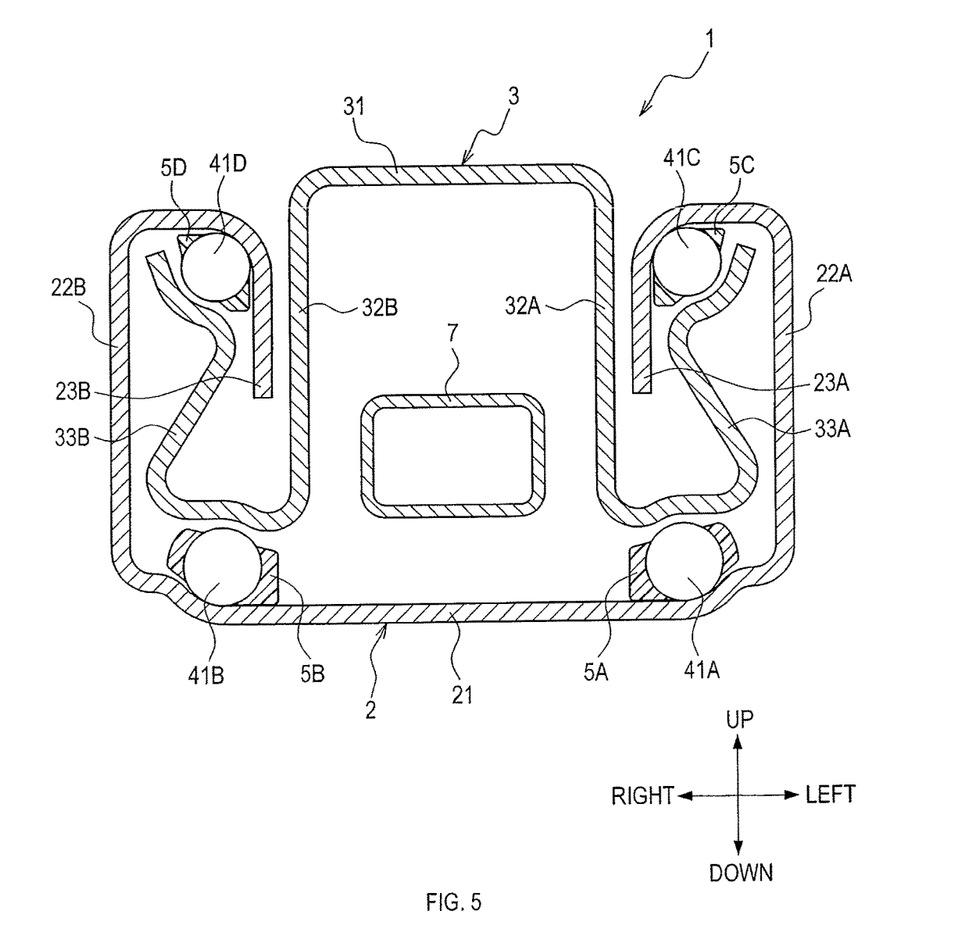
FIG. 5 is a sectional view taken along a line V-V in FIG. 8.
Figure 6:
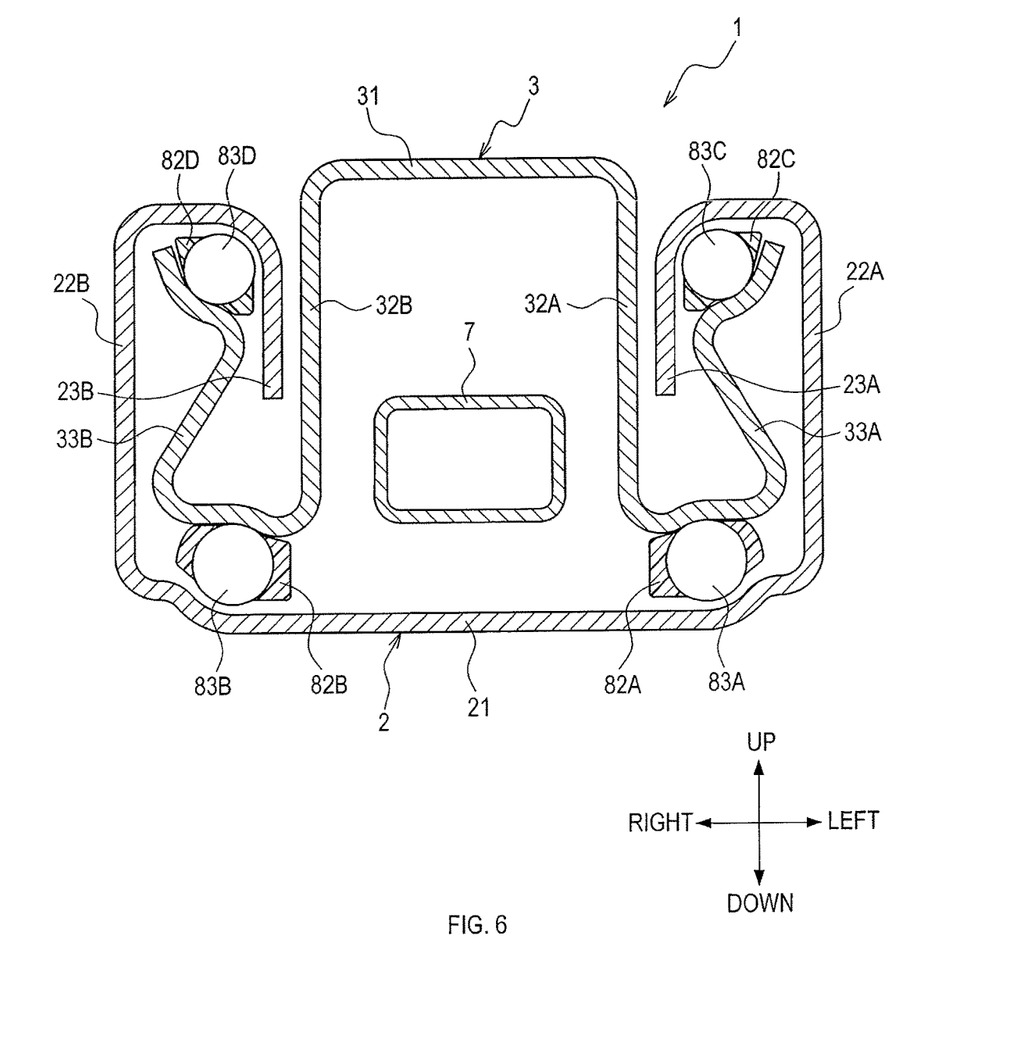
FIG. 6 is a sectional view taken along a line VI-VI in FIG. 8.
Figure 7:
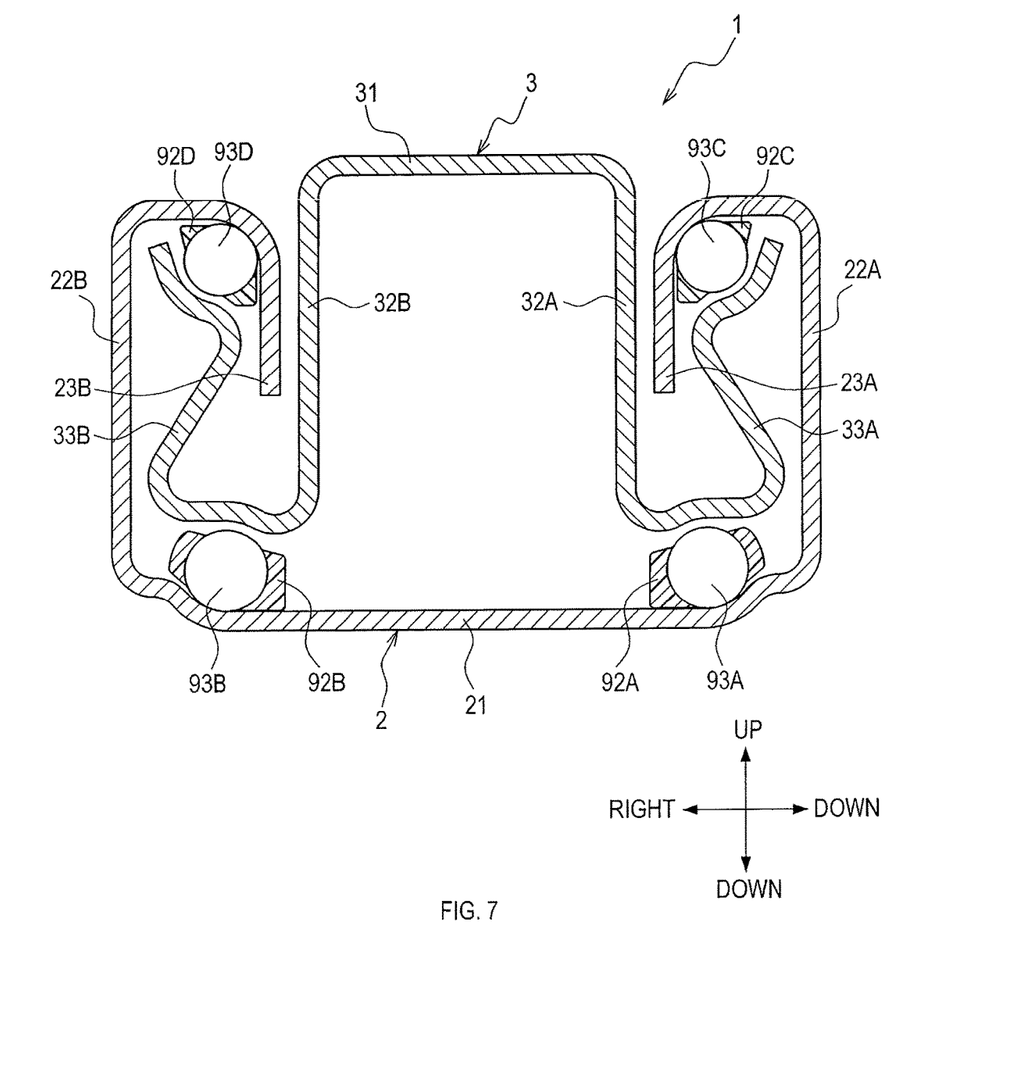
FIG. 7 is a sectional view taken along a line VII-VII in FIG. 8.

As shown in FIGS. 5 to 7, in a cross section orthogonal to the longitudinal direction of the fixed-side rail 2, the lower wall 21 couples a lower end of the left side wall 22A and a lower end of the right side wall 22B. The left side wall 22A extends upward from a left end of the lower wall 21. The right side wall 22B extends upward from a right end of the lower wall 21. The left side wall 22A and the right side wall 22B are arranged to face the left-right direction.

The left folded-back wall 23A is folded back to an inner side (a right side) of the left side wall 22A from an upper end of the left side wall 22A toward the lower wall 21, so as to extend downward. The right folded-back wall 23B is folded back to an inner side (a right side) of the right side wall 22B from an upper end of right side wall 22B toward the lower wall 21, so as to extend downward.

In a cross section orthogonal to the longitudinal direction of the fixed-side rail 2, the lower wall 21, the left side wall 22A, the right side wall 22B, the left folded-back wall 23A and the right folded-back wall 23B form an open cross section that opens upward. The lower wall 21 is fixed to the floor F of the vehicle.

As shown in FIG. 2, the movable-side rail 3 is a metal member formed by pressing a rolled steel plate or the like. The movable-side rail 3 comprises an upper wall 31 which is a lid wall, a left side wall 32A and a right side wall 32B, a left folded-back wall 33A and a right folded-back wall 33B. The upper wall 31, the left side wall 32A, the right side wall 32B, the left folded-back wall 33A and the right folded-back wall 33B extend in a strip-like manner in a longitudinal direction (a front-rear direction) of the movable-side rail 3.

As shown in FIGS. 5 to 7, in a cross section orthogonal to the longitudinal direction of the movable-side rail 3, the upper wall 31 couples an upper end of the left side wall 32A and an upper end of the right side wall 32B. The left side wall 32A extends downward from a left end of the upper wall 31. The right side wall 32B extends downward from a right end of the upper wall 31. The left side wall 32A and the right side wall 32B are arranged to face the left-right direction.

The left folded-back wall 33A is folded back to an outer side (a left side) of the left side wall 32A from a lower end of the left side wall 32A toward the upper wall 31, so as to extend upward. The right folded-back wall 33B is folded back to an outer side (a right side) of the right side wall 32B from a lower end of the right side wall 32B toward the upper wall 31, so as to extend upward.

In a cross section orthogonal to the longitudinal direction of the movable-side rail 3, the upper wall 31, the left side wall 32A, the right side wall 32B, the left folded-back wall 33A, and the right folded-back wall 33B form an open cross section that opens downward. The seat S is assembled to the upper wall 31 of the movable-side rail 3.

As shown in FIGS. 5 to 7, the movable-side rail 3 is assembled to the fixed-side rail 2. In particular, the left side wall 32A and the right side wall 32B of the movable-side rail 3 are arranged between the left folded-back wall 23A and the right folded-back wall 23B of the fixed-side rail 2. The left folded-back wall 33A of the movable-side rail 3 is arranged between the left side wall 22A and the left folded-back wall 23A of the fixed-side rail 2. The right folded-back wall 33B of the movable-side rail 3 is arranged between the right side wall 22B and the right folded-back wall 23B of the fixed-side rail 2.

The left folded-back wall 23A of the fixed-side rail 2 is arranged between the left side wall 32A and the left folded-back wall 33A of the movable-side rail 3. The right folded-back wall 23B of the fixed-side rail 2 is arranged between the right side wall 32B and the right folded-back wall 33B of the movable-side rail 3. Thus, the movable-side rail 3 is inhibited from coming off in an up-down direction with respect to the fixed-side rail 2.

As shown in FIG. 2, the first sliding bodies 41A to 41D, 42A to 42D are spheres made of resin. The first sliding bodies 41A to 41D, 42A to 42D are interposed between the fixed-side rail 2 and the movable-side rail 3, and are configured to be slidable in the front-rear direction (so as to be in rolling contact) with respect to the fixed-side rail 2 and the movable-side rail 3. The first sliding bodies 41A to 41D, 42A to 42D are respectively held by the retaining member 5A to 5D.

As shown in FIG. 2, the retaining members 5A to 5D are rod-shaped members made of resin, which extend along the longitudinal direction (the front-rear direction). At front end portions of the retaining members 5A to 5D, two first sliding bodies 41A to 41D are respectively held side by side in the front-rear direction. At rear end portions of the retaining members 5A to 5D, two sliding bodies 42A to 42D are respectively held side by side in the front-rear direction.

As shown in FIG. 5, the first sliding bodies 41A and the retaining member 5A are arranged between a left end portion of the lower wall 21 as well as a lower end portion of the left side wall 22A of the fixed-side rail 2, and a lower end portion (a base end portion) of the left folded-back wall 33A of the movable-side rail 3. The first sliding bodies 41B and the retaining member SB are arranged between a left end portion of the lower wall 21 as well as a lower end portion of the right side wall 22B of the fixed-side rail 2, and a lower end portion (a base end portion) of the right folded-back wall 33B of the movable-side rail 3.

The first sliding bodies 41C and the retaining member 5C are arranged between the left folded-back wall 23A of the fixed-side rail 2 and an upper end portion (a leading-end portion) of the left folded-back wall 33A of the movable-side rail 3. The first sliding bodies 41D and the retaining member 5D are arranged between the right folded-back wall 23B of the fixed-side rail 2 and an upper end portion (a leading-end portion) of the right folded-back wall 33B of the movable-side rail 3.

Although not shown, the first sliding bodies 42A to 42D are arranged at the same positions as positions where the first sliding bodies 41A to 41D are arranged between the fixed-side rail 2 and the movable-side rail 3.

Figure 3:
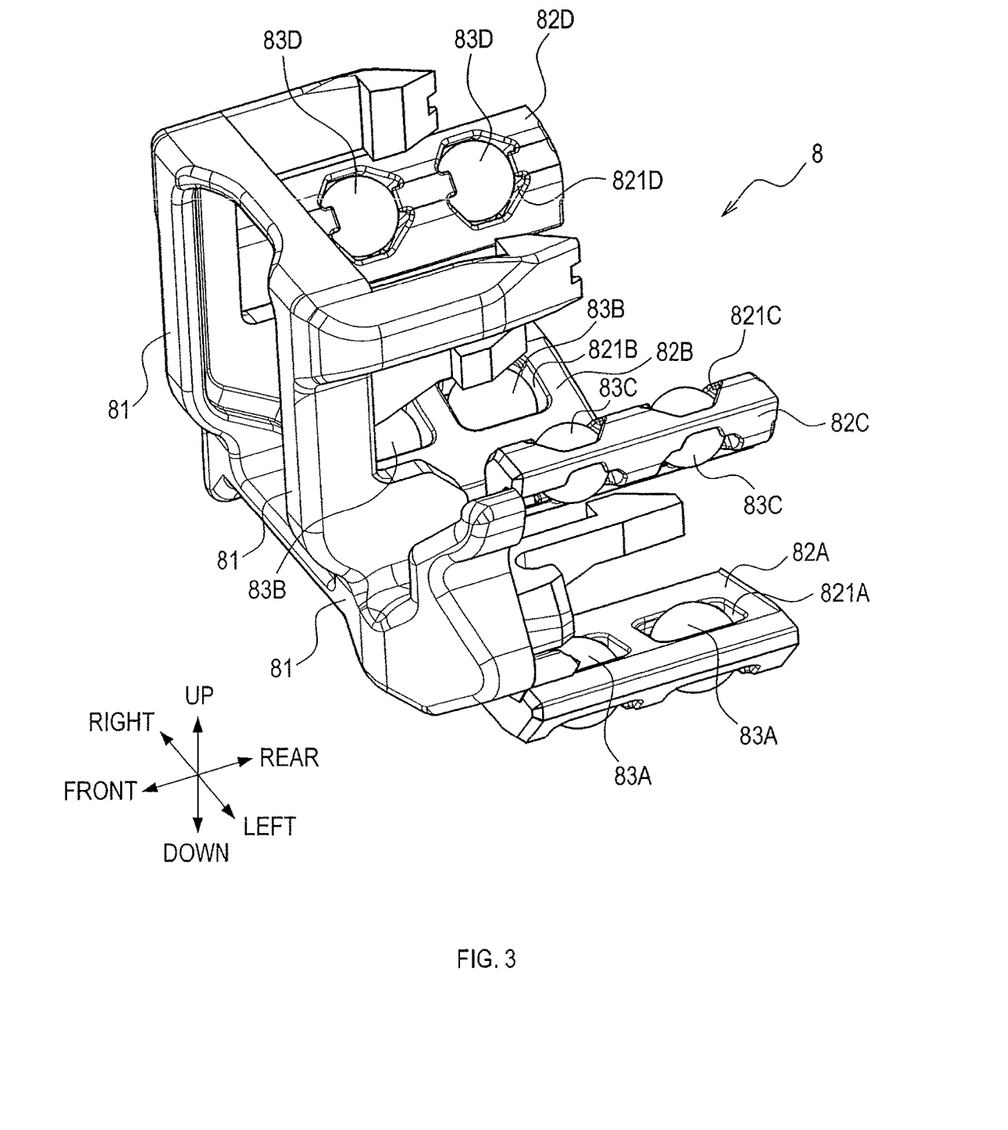
FIG. 3 is a perspective view of a covering member of a movable-side rail.

As shown in FIGS. 2 and 3, the covering member 8 is a member made of resin that is attached to a front end portion 301 of the movable-side rail 3 and covers the front end portion 301 of the movable-side rail 3. The covering member 8 comprises a main body 81, four extending portions 82A to 82D, and eight second sliding bodies 83A to 83D.

The main body 81 covers the front end portion 301 of the movable-side rail 3. The main body RI has a shape conforming to a shape of an end face of the front end portion 301 of the movable-side rail 3. The extending portions 82A to 82D extend rearward from the main body 81. On a lower side of the main body 81, the extending portions 82A and 82B are respectively provided on the left and right sides. On an upper side of the main body 81, the extending portions 82C and 82D are respectively provided on the left and right side. The extending portions 82A to 82D respectively have two retaining holes 821A to 821D for holding the second sliding bodies 83A to 83D.

The sliding bodies 83A to 83D are spheres made of resin. The second sliding bodies 83A to 83D are respectively held within the retaining holes 821A to 821D of the extending portions 82A to 82D so as not to come off. The extending portions 82A to 82D respectively hold two second sliding bodies 83A to 83D.

As shown in FIG. 6, the extending portion 82A and the second sliding bodies 83A are configured to be arrangeable between a left end portion of the lower wall 21 as well as a lower end portion of the left side wall 22A of the fixed-side rail 2, and a lower end portion of the left folded-back wall 33A of the movable-side rail 3. The extending portion 82B and the second sliding bodies 83B are configured to be arrangeable between a right end portion of the lower wall 21 as well as a lower end portion of the right side wall 22B of the fixed-side rail 2, and a lower end portion of the right folded-back wall 33B of the movable-side rail 3.

The extending portion 82C and the second sliding bodies 83C are configured to be arrangeable between the left folded-back wall 23A of the fixed-side rail 2 and an upper end portion of the left folded-back wall 33A of the movable-side rail 3. The extending portion 82D and the second sliding bodies 83D are configured to be arrangeable between the right folded-back wall 23B of the fixed-side rail 2 and an upper end portion of the right folded-back wall 33B of the movable-side rail 3.

The second sliding bodies 83A to 83D are configured to be able to be interposed at the same positions as the positions where the first sliding bodies 41A to 41D, 42A to 42D are interposed between the fixed-side rail 2 and the movable-side rail 3. The extending portions 82A to 82D are configured to be arrangeable at the same positions as positions where the retaining members 5A to 5D are arranged between the fixed-side rail 2 and the movable-side rail 3.

Figure 4:
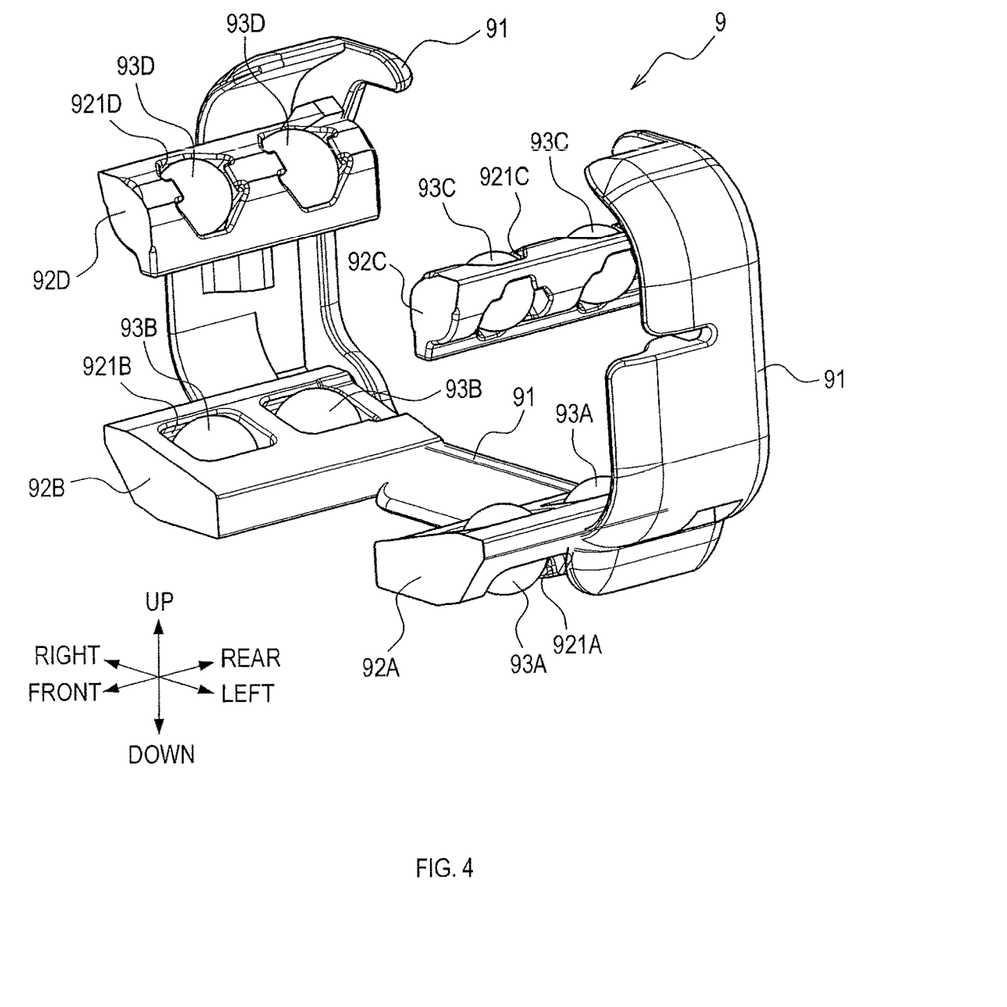
FIG. 4 is a perspective view of a covering member of a fixed-side rail.

As shown in FIGS. 2 and 4, the covering member 9 is a member made of resin that is attached to a rear end portion 202 of the fixed-side rail 2, and covers the rear end portion 202 of the fixed-side rail 2. The covering member 9 comprises a main body 91, four extending portions 92A to 92D, and eight second sliding bodies 93A to 93D.

The main body 91 covers the rear end portion 202 of the fixed-side rail 2. The main body 91 has a shape conforming to a shape of an end face of the rear end portion 202 of the fixed-side rail 2. The extending portions 92A to 92D extend forward from the main body 91. On a lower side of the main body 91, the extending portions 92A and 92B are respectively provided on the left and right sides. On an upper side of the main body 91, the extending portions 92C and 92D are respectively provided on the left and right sides. The extending portions 92A to 92D respectively have two retaining holes 921A to 921D that hold the second sliding bodies 93A to 93D.

The second sliding bodies 93A to 93D are spheres made of resin. The second sliding bodies 93A to 93D are respectively held within the retaining holes 921A to 921D of the extending portions 92A to 92D so as not to come off. The extending portions 92A to 92D respectively hold two second sliding bodies 93A to 93D.

As shown in FIG. 7, the extending portion 92A and the second sliding bodies 93A are configured to be arrangeable between a left end portion of the lower wall 21 as well as a lower end portion of the left side wall 22A of the fixed-side rail 2, and a lower end portion (a base portion) of the left folded-back wall 33A of the movable-side rail 3. The extending portion 92B and the second sliding bodies 93B are configured to be arrangeable between a right end portion of the lower wall 21 as well as a lower end portion of the right side wall 22B of the fixed-side rail 2, and a lower end portion (a base portion) of the right folded-back wall 33B of the movable-side rail 3.

The extending portion 92C and the second sliding bodies 93C are configured to be arrangeable between the left folded-back wall 23A of the fixed-side rail 2 and an upper end portion (a leading-end portion) of the left folded-back wall 33A of the movable-side rail 3. The extending portion 92D and the second sliding bodies 93D are configured to be arrangeable between the right folded-back wall 23B of the fixed-side rail 2 and an upper end portion (a leading-end portion) of the movable-side rail 3.

The second sliding bodies 93A to 93D are configured to be able to be interposed at the same positions as the positions where the first sliding bodies 41A to 41D, 42A to 42D are interposed between the fixed-side rail 2 and the movable-side rail 3. The extending portions 92A to 92D are configured to be arrangeable at the same positions as the positions where the retaining members 5A to 5D are interposed between the fixed-side rail 2 and the movable-side rail 3.

Figure 8:
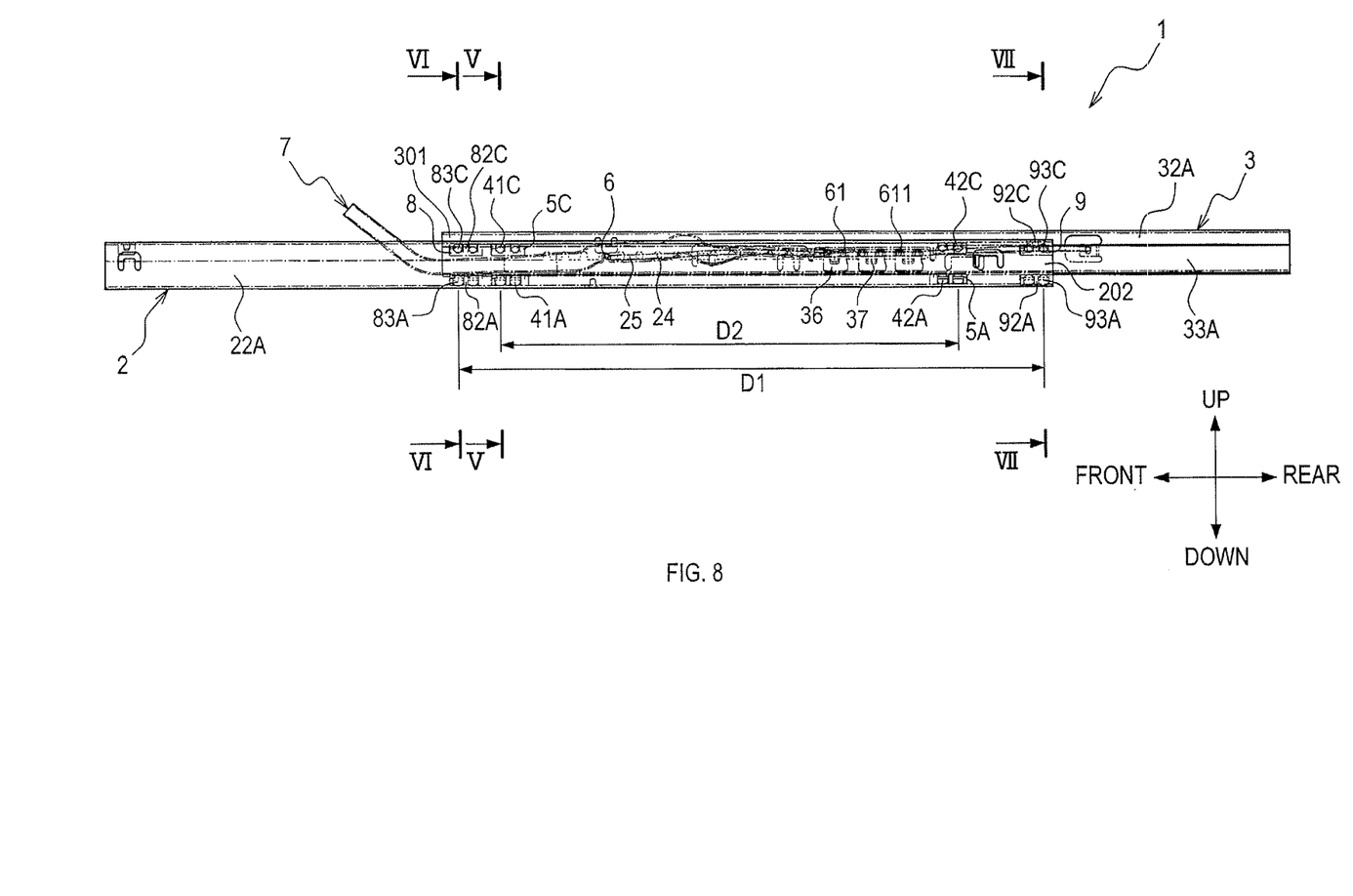
FIG. 8 is a side view showing a R/M state of the seat sliding device.
Figure 9:
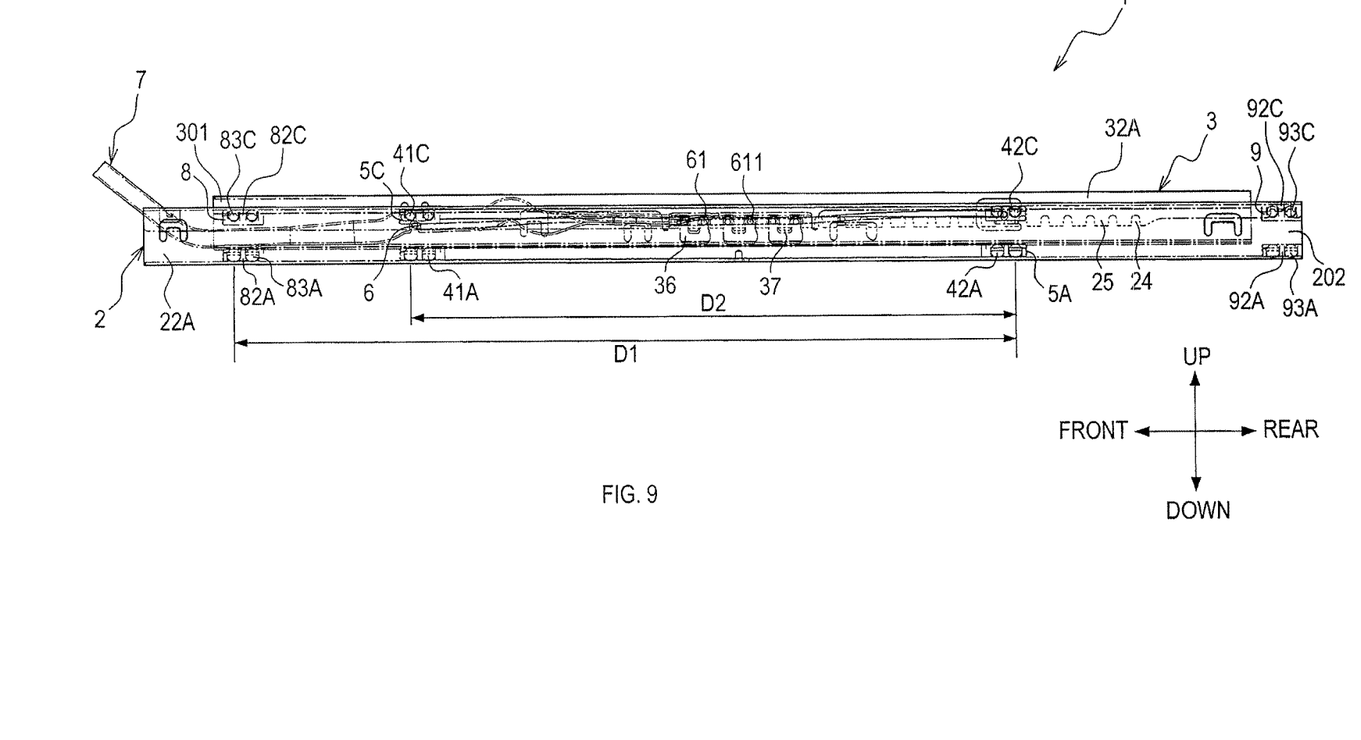
FIG. 9 is a side view showing a F/M state of the seat sliding device.
Figure 10:
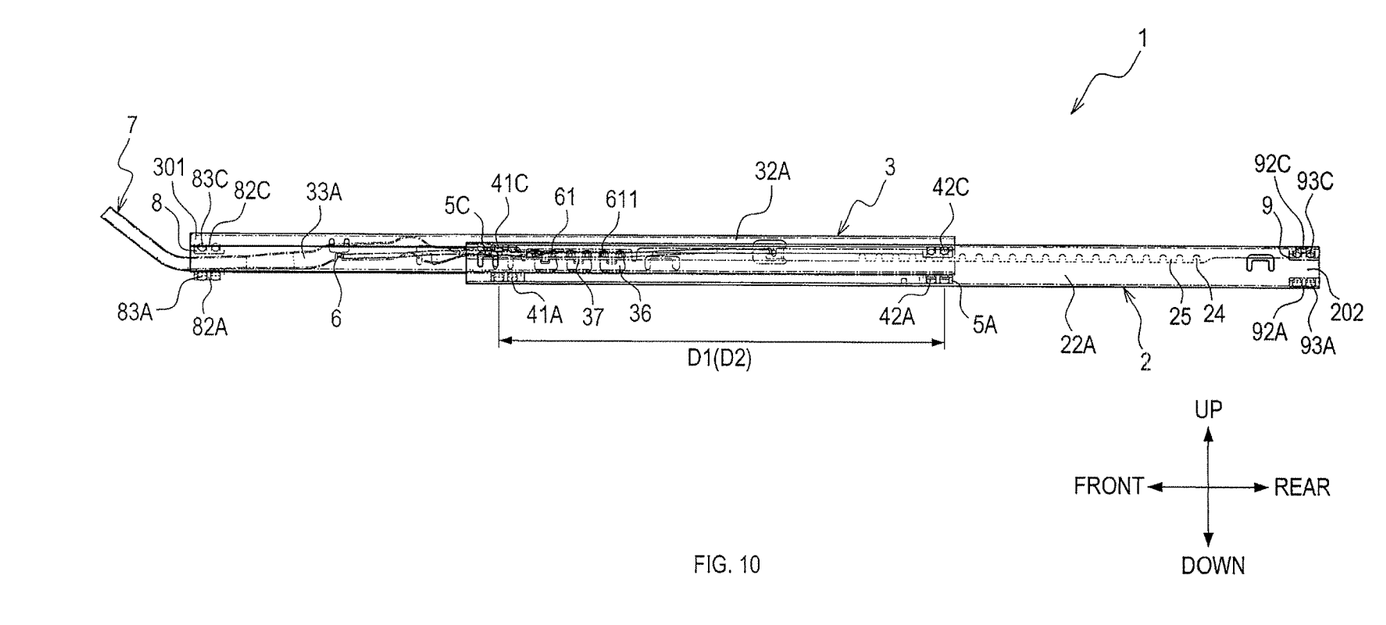
FIG. 10 is a side view showing a EXF/M state of the seat sliding device.

As shown in FIGS. 8 to 10, the movable-side rail 3 is configured to be slidable in the front-rear direction with respect to the fixed-side rail 2, via the first sliding bodies 41A to 41D, 42A to 42D are interposed. Also, the movable-side rail 3 is configured to be slidable in the front-rear direction with respect to the fixed-side rail 2, via either one or both of the second sliding bodies 83A to 83D and second sliding bodies 93A to 93D, in addition to the first sliding bodies 41A to 41D, 42A to 42D. The first sliding bodies 41A to 41D, 42A to 42D are positioned between the second sliding bodies 83A to 83D and the second sliding bodies 93A to 93D in the front-rear direction. Thus, the movable-side rail 3 is slidable in the front-rear direction with respect to the fixed-side rail 2.

As shown in FIG. 2, the lock spring 6 is a member configured to restrain sliding of the movable-side rail 3 with respect to the fixed-side rail 2. The lock spring 6 is provided within the movable-side rail 3 (within a space provided by the upper wall 31, the left side wall 32A, and the right side wall 32B).

The lock spring 6 comprises a lock portion 61, a first elastically deforming portion 62, and a second elastically deforming portion 63. The lock portion 61 is a portion configured to restrain sliding of the movable-side rail 3 with respect to the fixed-side rail 2. The first elastically deforming portion 62 and the second elastically deforming portion 63 are portions configured to displaceably support the lock portion 61.

The lock portion 61 is displaceable between a restraint position, in which sliding of the movable-side rail 3 with respect to the fixed-side rail 2 is restrained, and a release position, in which such restraint is eliminated. The lock portion 61 is displaceable in the up-down direction. The restraint position is where the lock portion 61 is at an upper position, and the release position is where the lock portion 61 is at a lower position. The lock portion 61 comprises a plurality of engagement portions 611.

Each of the left side wall 32A and the right side wall 32B of the movable-side rail 3 comprises a plurality of cut-outs 34. The respective cut-outs 34 are through-holes, into which the linear material constituting the engagement portions 611 of the lock spring 6 can fit. Between the respective cut-outs 34, an engaging piece 35 is provided.

Each of the left folded-back wall 33A and the right folded-back wall 33B of the movable-side rail 3 comprises a plurality of cut-outs 36. The respective cut-outs 36 are through-holes, into which the linear material constituting the engagement portions 611 of the lock spring 6 can fit. Between the respective cut-outs 36, an engaging piece 37 is provided.

In a state in which the engagement portions 611 of the lock spring 6 fit into the cut-outs 34, the engagement portions 611 fit into the corresponding cut-outs 36. Then, the engagement portions 611 are engaged with the engaging piece 35 and the engaging piece 37.

A plurality of cut-out 24 are arranged to the left folded-back wall 23A and the right folded-back wall 23B of the fixed-side rail 2. The respective cut-outs 24 are concave recesses into which the linear material constituting the engagement portions 611 of the lock spring 6 can fit. Between the respective cut-outs 24, an engaging piece 25 is provided.

In a state in which the engagement portions 611 of the lock spring 6 fit into the cut-outs 24, the engaging pieces 25 and the engagement portions 611 can be engaged with each other. A position in which the engagement portions 611 are engaged with the engaging pieces 35, 37, and 25 is the restraint position, whereas a position in which the engagement portions 611 are spaced apart from the engaging pieces 35, 37, and 25, i.e., spaced apart from the cut-outs 34, 36, and 24, is the release position.

As shown in FIG. 2, the releasing member 7 is a member configured to eliminate the restraint by the lock spring 6. In particular, the releasing member 7 is a member configured to switch a deformed state of the first elastically deforming portion 62 and the second elastically deforming portion 63 of the lock spring 6. The releasing member 7 is provided between the upper wall 31 of the movable-side rail 3 and the first elastically deforming portion 62 of the lock spring 6, within the movable-side rail 3 (within a space provided by the upper wall 31, the left side wall 32A, and the right side wall 32B).

An operation portion 71 is provided at a first end of the releasing member 7. The operation portion 71 is a portion operated directly or indirectly by a vehicle occupant. Provided at a second end of the releasing member 7 is a pressing portion 72. When an operation force is applied to the operation portion 71, the pressing portion 72 presses the lock portion 61 of the lock spring 6 from the restraint position to the release position by means of the operation force.

In the releasing member 7, a fulcrum portion 73 having a convex shape is provided. The fulcrum portion 73 contacts the upper wall 31 of the movable-side rail 3, to thereby constitute a pivot center of the releasing member 7. In other words, in a state in which the operation force is not applied to the releasing member 7, the pressing portion 72 is pressed toward the upper wall 31 of the movable-side rail 3, i.e., toward an upward side, by means of an elastic force applied from the first elastically deforming portion 62 and second elastically deforming portion 63 of the lock spring 6. Thus, in the state in which the operation force is not applied to the releasing member 7, the operation portion 71 is positioned on a lower side.

When the operation force to move the operation portion 71 toward the upward side is applied to the releasing member 7, the pressing portion 72 is displaced about the fulcrum portion 73 toward a downward side. Thus, the lock portion 61 of the lock spring 6 is displaced toward the downward side and brought into the release position. Then, when the aforementioned operation force disappears, the lock portion 61 is restored to the restraint position by means of a restoring force of the first elastically deforming portion 62 and the second elastically deforming portion 63 of the lock spring 6.

An explanation will now be made about a sliding operation of the movable-side rail 3 of the seat sliding device 1.

FIG. 8 shows a rear-most state (hereinafter, a R/M state) where the movable-side rail 3 is positioned on the most rear side within a normal slide range of the movable-side rail 3. Part of the movable-side rail 3 is positioned on the rear side of a rear end of the fixed-side rail 2.

In the R/M state, for example, when an external load is applied at the time of collision of the vehicle, the fixed-side rail 2 and movable-side rail 3 can be held by the first sliding bodies 41A to 41D, 42A to 42D of the retaining members 5A to 5D, the second sliding bodies 83A to 83D of the covering member 8, and the second sliding bodies 93A to 93D of the covering member 9.

At this time, a maximum distance in the front-rear direction that enables the fixed-side rail 2 and the movable-side rail 3 to be held by the first sliding bodies 41A to 41D, 42A to 42D and the second sliding bodies 83A to 83D, 93A to 93D (a first retention pitch D1) is a maximum distance between the second sliding bodies 83A to 83D and the second sliding bodies 93A to 93D.

Further, a maximum distance in the front-rear direction that enables the fixed-side rail 2 and the movable-side rail 3 to be held by the first sliding bodies 41A to 41D, 42A to 42D (a second retention pitch D2) is a maximum distance between the first sliding bodies 41A to 41D and the first sliding bodies 42A to 42D. The second retention pitch D2 is a fixed distance. A relationship between the first retention pitch D1 and the second retention pitch D2 is D1>D2.

FIG. 9 shows a front-most state (hereinafter, a F/M state) where the movable-side rail 3 is positioned on the most front side within the normal slide range of the movable-side rail 3. The entire movable-side rail 3 overlaps the fixed-side rail 2 in the front-rear direction. A rear end of the movable-side rail 3 is positioned on the front side of the covering member 9 of the fixed-side rail 2.

In the F/M state, for example, when an external load is applied at the time of collision of the vehicle, the fixed-side rail 2 and the movable-side rail 3 can be held by the first sliding bodies 41A to 41D, 42A to 42D of the retaining members 5A to 5D, and the second sliding bodies 83A to 83D of the covering member 8.

At this time, the first retention pitch D1 is a maximum distance between the second sliding bodies 83A to 83D and the first sliding bodies 42A to 42D. The relationship between the first retention pitch D1 and the second retention pitch D2 is D1>D2.

FIG. 10 shows an extra front-most state (hereinafter, an EXF/M state) where the movable-side rail 3 is positioned on the most front side beyond the normal slide range of the movable-side rail 3. A front end of the movable-side rail 3 is positioned on the front side of the fixed-side rail 2. A front end of the fixed-side rail 2 is positioned on the rear side of the covering member 8 of the movable-side rail 3.

In the EXF/M state, for example, when an external load is applied at the time of collision of the vehicle, the fixed-side rail 2 and the movable-side rail 3 can be held by the first sliding bodies 41A to 41D, 42A to 42D of the retaining members 5A to 5D.

At this time, the first retention pitch D1, similar to the second retention pitch D2, is the maximum distance between the first sliding bodies 41A to 41D and the first sliding bodies 42A to 42D. In other words, the relationship between the first retention pitch D1 and the second retention pitch D2 is D1=D2.

An explanation will now be made about the function and effect of the seat sliding device 1 of the present embodiment.

The seat sliding device 1 of the present embodiment comprises the covering member 8 that covers the front end portion 301 of the movable-side rail 3 and the covering member 9 that covers the rear end portion 202 of the fixed-side rail 2. Then, the covering member 8 comprises the second sliding bodies 83A to 83D at the extending portions 82A to 82D. The covering member 9 comprises the second sliding bodies 93A to 93D at the extending portions 92A to 92D. Therefore, for example, when an external load is applied at the time of collision of the vehicle, the fixed-side rail 2 and the movable-side rail 3 can be held not only by the first sliding bodies 41A to 41D, 42A to 42D but also by the second sliding bodies 83A to 83D, 93A to 93D.

For example, in the present embodiment, the relationship between the first retention pitch D1 and the second retention pitch D2 is D1>D2. In other words, the first retention pitch D1 can be the same or longer than the second retention pitch D2. In particular, the first retention pitch D1 can be longer than the second retention pitch D2 in the normal slide range (between a position of the R/M state and a position of the F/M state) of the movable-side rail 3. In addition, the first retention pitch D1 can secure the same length as a length of the second retention pitch D2 even in a range exceeding the normal slide range of the movable-side rail 3 (between a position on the front side of the F/M state and a position of the EXF/M state).

Thus, rigidity against external loads can be improved. Accordingly, for example, even if the lengths of the fixed-side rail 2 and the movable-side rail 3 are shortened, or the fixed-side rail 2 and the movable-side rail 3 are thinned, while the slide distance of the movable-side rail 3 is maintained or increased, rigidity against external loads can be sufficiently secured. Decrease in rigidity against external loads, and increase in deflection of the fixed-side rail 2 and the movable-side rail 3 when external loads are applied, as in the past can be inhibited.

Also, the front end portion 301 of the movable-side rail 3 is covered by the main body 81 of the covering member 8. The rear end portion 202 of the fixed-side rail 2 is covered by the main body 91 of the covering member 9. Thus, contact to the front end portion 301 of the movable-side rail 3 and the rear end portion 202 of the fixed-side rail 2 of limbs or the like of a person seated on the seat S is inhibited, the risk of the limbs or the like reaching internal spaces of the fixed-side rail 2 and the movable-side rail 3 is reduced, and improvement in appearance can be achieved.

Further, in the seat sliding device 1 of the present embodiment, the fixed-side rail 2 is configured to be relatively slidable with respect to the movable-side rail 3 between a position on an inner side (the rear side) of the covering member 3 and a position on an outer side (the front side) of the covering member 9 in the front-rear direction. Therefore, even if the fixed-side rail 2 is configured to be able to project from the front end portion 301 of the movable-side rail 3, the effect to improve rigidity against external loads can be sufficiently achieved by the covering member 8 provided at the front end portion 301 of the movable-side rail 3.

Further, the movable-side rail 3 is configured to be slidable with respect to the fixed-side rail 2 between a position on an inner side (the front side) and a position on an outer side (the rear side) of the covering member 9 of the fixed-side rail 2 in the front-rear direction. Therefore, even if the movable-side rail 3 is configured to be able to project from the rear end portion 202 of the fixed-side rail 2, the effect to improve rigidity against external loads can be sufficiently achieved by the covering member 9 provided at the rear end portion 202 of the fixed-side rail 2.

Further, the covering member 8 is provided at the front end portion 301 of the movable-side rail 3, and the covering member 9 is provided at the rear end portion 202 of the fixed-side rail 2. In this case, rigidity against external loads can be all the more improved by the covering members 8 and 9.

Further, the first sliding bodies 41A to 41D, 42A to 42D are configured to be positioned between the second sliding bodies 83A to 83D of the covering member 8 of the movable-side rail 3 and the second sliding bodies 93A to 93D of the covering member 9 of the fixed-side rail 2 in the front-rear direction. Therefore, when an external load is applied, the fixed-side rail 2 and the movable-side rail 3 can be effectively held by the first sliding bodies 41A to 41D, 42A to 42D and the second sliding bodies 83A to 83D, 93A to 93D.

Further, the second sliding bodies 83A to 83D, when viewed from the front-rear direction, are configured to be interposed at the same positions as the positions where the first sliding bodies 41A to 41D, 42A to 42D are interposed between the fixed-side rail 2 and the movable-side rail 3. Therefore, when an external load is applied, a configuration to hold the fixed-side rail 2 and the movable-side rail 3 by the first sliding bodies 41A to 41D, 42A to 42D and the second sliding bodies 83A to 83D, 93A to 93D can be simplified.

Further, the second sliding bodies 83A to 83D, 93A to 93D are arranged between the fixed-side rail 2 and the respective upper end portions (leading-end portions) of the left folded-back wall 33A and the right folded-back wall 33B of the movable-side rail 3, and between the fixed-side rail 2 and the respective lower end portions (base end portions) of the left folded-back wall 33A and the right folded-back wall 33B of the movable-side rail 3. Therefore, when an external load is applied, the fixed-side rail 2 and the movable-side rail 3 can be sufficiently held by the second sliding bodies 83A to 83D, 93A to 93D. Thus, rigidity against external loads can be all the more improved.

[Other Embodiments]

The present disclosure is not limited to the above embodiment, and can be practiced in various modes within the scope not departing from the present disclosure.

(1) In the above-described embodiment, the explanation has been made about a sliding device for a vehicle seat of a car. For example, the present disclosure may be applied to a sliding device for a vehicle seat for use in a railroad or the like other than a car, and a seat sliding device for use in other vehicles, such as an airplane, a ship or the like.

(2) In the above-described embodiment, the covering member is provided in both the fixed-side rail and the movable-side rail. The cover member may be provided in only one of the fixed-side rail and the movable-side rail. Also, in the above-described embodiment, the cover member is provided on one end portion (the rear end portion) of the fixed-side rail, but may be provided on both end portions of the fixed-side rail. Also, in the above-described embodiment, the cover member is provided on one end portion (the front end portion) of the movable-side rail, but may be provided on both end portions of the movable-side rail.

(3) In the above-described embodiment, the first sliding bodies are used which are spheres made of resin. The material of the first sliding bodies is not limited to this. For example, the first sliding bodies may be made of metal or the like. Also, the shape, configuration or the like of the first sliding bodies are not limited to those of the above embodiment. Any shape, configuration or the like may be employed as long as the movable-side rail can be configured to be slidable in the sliding direction with respect to the fixed-side rail.

(4) In the above-described embodiment, the second sliding bodies are used that are spheres made of resin. The material of the second sliding bodies is not limited to this. For example, the second sliding bodies may be made of metal or the like. Also, the shape, configuration or the like of the second sliding bodies are not limited to those of the above embodiment. Any shape, configuration or the like may be employed as long as the movable-side rail can be configured to be slidable in the sliding direction with respect to the fixed-side rail. For example, the second sliding bodies may be formed integrally with the extending portion of the covering member, and not separately from the extending portion.

(5) In the above-described embodiment, the second sliding bodies are arranged both between the fixed-side rail and the respective leading-end portions (upper end portions) of the left folded-back wall and the right folded-back wall of the movable-side rail, and between the fixed-side rail and the respective base end portions (lower end portions) of the left folded-back wall and the right folded-back wall of the movable-side rail, but may be arranged either of the two. In particular, in the fixed-side rail, it is preferable that the second sliding bodies are arranged at least between the fixed-side rail and the respective base end portions of the left folded-back wall and the right folded-back wall of the movable-side rail. Further, in the movable-side rail, it is preferable that the second sliding bodies are arranged at least between the fixed-side rail and the respective leading-end portions of the left folded-back wall and the right folded-back wall of the movable-side rail. In these cases, the effect to improve rigidity against external loads can be all the more enhanced.

(6) A function of one component in the above-described embodiment may be implemented by a plurality of components, or each function of a plurality of components may be implemented by one component. Part of the configuration of the above embodiment may be omitted. Further, at least part of the configuration of the above embodiment may be added to, replaced with, etc. a configuration other than the configuration of the above embodiment. All the modes contained in the technical idea specified from the wording of the claims are embodiments of the present disclosure.

What is claimed is:

1. A seat sliding device that slidably supports a conveyance seat, the device comprising:
    a fixed-side rail;
    a movable-side rail that is configured to support the conveyance seat and to be assembled to the fixed-side rail, so as to be slidable with respect to the fixed-side rail;
    a plurality of first sliding bodies that are disposed between the fixed-side rail and the movable-side rail, so as to make the movable-side rail slide in a sliding direction with respect to the fixed-side rail;
    a plurality of second sliding bodies that are arranged at least at a terminal end on a first side of at least one of the fixed-side rail and the movable-side rail in the sliding direction, the second sliding bodies being configured to be interposed between the fixed-side rail and the movable-side rail so as to be able to make the movable-side rail slide in the sliding direction with respect to the fixed-side rail, and
    at least one covering member including a first covering member that covers and that is fixed to at least the end on the first side of the at least one of the fixed-side rail and the movable-side rail in the sliding direction, wherein the plurality of second sliding bodies are arranged in the at least one covering member,
    wherein the at least one covering member comprises a second covering member, such that the first covering member is provided at the end on the first side of the fixed-side rail in the sliding direction, and the second covering member is provided at an end on a second side of the movable-side rail in the sliding direction.

2. The seat sliding device according to claim 1,
    wherein the first covering member comprises a main body that covers the end on the first side of the fixed-side rail in the sliding direction, and an extending portion that extends from the main body toward the second side of the sliding direction along the rail provided with the main body, and
    wherein the plurality of second sliding bodies are provided at the extending portion.

3. The seat sliding device according to claim 2,
    wherein the other of the fixed-side rail and the movable-side rail is configured to be relatively slidable with respect to the one of the fixed-side rail and the movable-side rail between a position on an inner side and a position on an outer side of the covering member of the one of the fixed-side rail and the movable-side rail in the sliding direction.

4. The seat sliding device according to claim 1,
    wherein the plurality of first sliding bodies are configured to be positioned between the plurality of second sliding bodies of the first covering member of the fixed-side rail and the plurality of second sliding bodies of the second covering member of the movable-side rail in the sliding direction.

5. The seat sliding device according to claim 1, wherein the plurality of second sliding bodies, when viewed from the sliding direction, are configured to be interposed at the same positions as positions where the first sliding bodies are interposed between the fixed-side rail and the movable-side rail.

6. The seat sliding device according to claim 1,
    wherein the movable-side rail comprises two side walls, a lid wall that couples respective one ends of the two side walls, and two folded-back walls that extend so as to be folded back outward from the other ends of the two side walls toward the lid wall,
    wherein the plurality of second sliding bodies are arranged at least one of between the fixed-side rail and respective leading-end portions of the two folded-back walls of the movable-side rail, and between the fixed-side rail and respective base end portions of the two folded-back walls of the movable-side rail.

7. The seat sliding device according to claim 6,
    wherein the plurality of second sliding bodies are arranged both between the fixed-side rail and the respective leading-end portions of the two folded-back walls of the movable-side rail, and between the fixed-side rail and the respective base end portions of the two folded-back walls of the movable-side rail.

8. The seat sliding device according to claim 1, wherein the first covering member is fixed to at least the end on the first side of the at least one of the fixed-side rail and the movable-side rail in the sliding direction such that the first covering member cannot move relative to the at least one of the fixed-side rail and the movable-side rail in the sliding direction.

9. A seat sliding device that slidably supports a conveyance seat, the device comprising:
    a fixed-side rail;
    a movable-side rail that is configured to support the conveyance seat and to be assembled to the fixed-side rail, so as to be slidable with respect to the fixed-side rail;
    a plurality of first sliding bodies that are disposed between the fixed-side rail and the movable-side rail, so as to make the movable-side rail slide in a sliding direction with respect to the fixed-side rail;
    a plurality of second sliding bodies that are arranged at least at a terminal end on a first side of at least one of the fixed-side rail and the movable-side rail in the sliding direction, the second sliding bodies being configured to be interposed between the fixed-side rail and the movable-side rail so as to be able to make the movable-side rail slide in the sliding direction with respect to the fixed-side rail, and
    at least one covering member including a first covering member that covers and that is fixed to at least the end on the first side of the at least one of the fixed-side rail and the movable-side rail in the sliding direction, wherein the plurality of second sliding bodies are arranged in the at least one covering member,
    wherein the movable-side rail comprises two side walls, a lid wall that couples respective one ends of the two side walls, and two folded-back walls that extend so as to be folded back outward from the other ends of the two side walls toward the lid wall, and
    wherein the plurality of second sliding bodies are arranged at least one of between the fixed-side rail and respective leading-end portions of the two folded-back walls of the movable-side rail, and between the fixed-side rail and respective base end portions of the two folded-back walls of the movable-side rail.

10. The seat sliding device according to claim 9,
wherein the at least one covering member comprises a main body that covers the end, and an extending portion that extends from the main body toward a second side of the sliding direction along the rail provided with the main body, and
wherein the plurality of second sliding bodies are provided at the extending portion.

11. The seat sliding device according to claim 10,
wherein the other of the fixed-side rail and the movable-side rail is configured to be relatively slidable with respect to the one of the fixed-side rail and the movable-side rail between a position on an inner side and a position on an outer side of the covering member of the one of the fixed-side rail and the movable-side rail in the sliding direction.

12. The seat sliding device according to claim 9,
wherein the at least one covering member comprises a second covering member, such that the first covering member is provided at the end on the first side of the fixed-side rail in the sliding direction, and the second covering member is provided at an end on a second side of the movable-side rail in the sliding direction, and
wherein the plurality of first sliding bodies are configured to be positioned between the plurality of second sliding bodies of the first covering member of the fixed-side rail and the plurality of second sliding bodies of the second covering member of the movable-side rail in the sliding direction.

13. The seat sliding device according to claim 9, wherein the plurality of second sliding bodies, when viewed from the sliding direction, are configured to be interposed at the same positions as positions where the first sliding bodies are interposed between the fixed-side rail and the movable-side rail.

14. The seat sliding device according to claim 9,
wherein the plurality of second sliding bodies are arranged both between the fixed-side rail and the respective leading-end portions of the two folded-back walls of the movable-side rail, and between the fixed-side rail and the respective base end portions of the two folded-back walls of the movable-side rail.

15. The seat sliding device according to claim 9, wherein the first covering member is fixed to at least the end on the first side of the at least one of the fixed-side rail and the movable-side rail in the sliding direction such that the first covering member cannot move relative to the at least one of the fixed-side rail and the movable-side rail in the sliding direction.

* * * * *